(12) United States Patent
Azzopardi et al.

(10) Patent No.: US 6,451,432 B1
(45) Date of Patent: Sep. 17, 2002

(54) HYDROPHOBIC TREATMENT COMPOSITION, METHOD FOR FORMING A COATING AND PRODUCTS PROVIDED WITH SAID COATING

(75) Inventors: Marie-Jose Azzopardi, Vincennes; Laurent DeLattre, Paris; Nathalie Codazzi, Eaubonne, all of (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 09/764,999
(22) PCT Filed: Jul. 22, 1999
(86) PCT No.: PCT/FR99/01799
§ 371 (c)(1),
(2), (4) Date: Jul. 26, 2001
(87) PCT Pub. No.: WO00/05321
PCT Pub. Date: Feb. 3, 2000

(30) Foreign Application Priority Data

Jul. 24, 1998 (FR) .............................. 98 09476

(51) Int. Cl.⁷ .............................. B32B 17/06; C09K 3/18
(52) U.S. Cl. ................ 428/429; 106/2; 106/287.13; 106/287.14; 106/287.16; 106/287.27; 427/162; 427/163.3; 427/165; 427/419.8; 428/447; 428/448; 428/912.2

(58) Field of Search ................. 106/287.13, 287.14, 106/287.16, 287.27, 2; 427/162, 163.3, 165, 419.5, 419.8; 428/428, 429, 447, 448, 912.2

(56) References Cited

U.S. PATENT DOCUMENTS 5,997,943 A    12/1999  Azzopardi et al. .......... 427/167
6,258,156 B1 *  7/2001  Azzopardi et al. ...... 106/287.14

FOREIGN PATENT DOCUMENTS

EP           0759413 A1 *  2/1997

* cited by examiner

Primary Examiner—D. S. Nakarani
(74) Attorney, Agent, or Firm—Oblon, Spivak, McClelland, Maier & Neustadt, P.C.

(57) ABSTRACT

An aqueous solution of a hydrophobic/oleophobic agent incorporating a primer of formula:

$$X_3SiRSiX_3 \qquad (I)$$

in which:

R represents a carbon chain, and

X represents a hydrolysable functional group.

19 Claims, No Drawings

HYDROPHOBIC TREATMENT COMPOSITION, METHOD FOR FORMING A COATING AND PRODUCTS PROVIDED WITH SAID COATING

FIELD OF THE INVENTION

The present invention relates to the hydrophobic/oleophobic treatment of a substrate, especially made of a glass material, a ceramic, a glass ceramic or a plastic.

This type of treatment is intended, in a known manner, to impart non-wettability on the substrate.

The term "wettability" should be understood to mean the property whereby polar or non-polar liquids adhere to the substrate and form an undesirable film, as well as the tendency of a substrate to retain dust or dirt particles of any type, fingermarks, insects, etc.

BACKGROUND OF THE INVENTION

The presence of water and/or dirt particles is undesirable, in particular for a transparent substrate of the glazing type, especially used in the transport field.

A substrate exhibits the property of non-wettability, more commonly referred to as hydrophobicity/oleophobicity, when the contact angles between a liquid and this substrate are high, for example at least 90° in the case of water. The liquid therefore has a tendency to run off easily, in the form of drops, on the substrate simply by gravity, if the substrate is inclined, or under the effect of aerodynamic forces in the case of a moving vehicle. Known agents for imparting this hydrophobicity/oleophobicity property are, for example, fluoroalkyl-silanes, such as those described in Patent Applications EP 0,492,417, EP 0,492,545 and EP 0,672,779. According to these documents, this layer is obtained by applying a solution containing fluoroorganosilanes in a non-aqueous organic solvent to the surface of a substrate. As non-aqueous organic solvent, document EP 0,492,545 mentions, in particular, n-hexadecane, toluene, xylene, etc. These solvents are particularly suitable for a fluorochlorosilane. It is also possible, according to that document, to use a methyl or ethyl alcohol as the solvent when the fluorosilane is a fluoroalkoxysilane.

Common hydrophobic/oleophobic agents are, in particular, alkyltrihalosilanes or trialkoxysilanes, the alkyl group of which has at least one perfluorinated end, that is to say consisting of an $F_3C$—$(CF_2)$—$_n$ group in which n is a positive or zero integer. For these hydrophobic/oleophobic agents, Patent Application EP 0,719,743 mentions perfluorinated carbides as suitable solvents.

It is also known, from the aforementioned Application EP 0,492,545 A2, to increase the adhesion of the hydrophobic/oleophobic coating by subjecting the substrate to a priming treatment before applying the coating. This treatment consists in forming a thin interlayer using agents called priming agents or primers which are silicon compounds having at least two hydrolysable functional groups. One of the two hydrolysable functional groups provides the chemical bond to the substrate via an oxygen atom linked to the silicon atom; the second hydrolysable functional group reacts into a hydroxyl group linked to the silicon atom, which, by reacting subsequently with a hydrolysable functional group of the hydrophobic/oleophobic agent, will form a point of attachment to the latter. Application EP 0,492,545 A2 mentions, as priming agents, compounds $SiCl_4$, $SiHCl_3$, $SiH_2Cl_2$ and Cl—$(SiCl_2O)_n SiCl_3$, n being an integer between 1 and 4.

According to another technique, indicated by document EP 0,548,775 A1, the compounds mentioned above as priming agents are mixed with the hydrophobic/oleophobic agent in solution. Although in this case there is no longer any priming, the terms "integrated primer" or "integrated priming agent" are frequently used for these compounds. Document EP 0,548,775 A1 thus describes aqueous solutions of hydrophobic/oleophobic agents, including $Si(OCH_3)_4$, $Si(OC_2H_5)_4$, $H_3CSi(OCH_3)_3$ or $Si(OC_3H_7)_4$. In this type of approach, the hydrolysis and condensation reactions described above already partly occur between the integrated priming agent and the hydrophobic/oleophobic agent before the application of the treatment solution to the substrate. During this application, still-available hydrolysable functional groups belonging to one or other of the two compounds participate in the adhesion to the substrate, and others to the linking of two such compounds together, whether they be of different or even identical nature.

SUMMARY OF THE INVENTION

The invention makes available a family of novel integrated priming agents which are modifiable and compatible with the hydrophobic/oleophobic agents, such as those mentioned above.

The subject of the invention is therefore a composition for a hydrophobic/oleophobic coating, consisting of an aqueous solution of a hydrophobic/oleophobic agent containing a priming agent of formula:

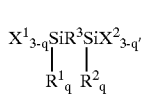

(I)

in which:

$R^3$ represents a carbon chain;

$R^1$ and $R^2$ each represent an alkyl group or a hydrogen atom;

$X^1$ and $X^2$ are identical or different hydrolysable functional groups such as a halogen or an alkoxy, and q and q' are equal to 0, 1 or 2.

DETAILED DESCRIPTION OF THE INVENTION AND PREFERRED EMBODIMENTS THEREOF

Under hydrolysis conditions, the carbon chain $R^3$ is not viable to scission and its entire backbone is preserved. The molecule of formula (I) therefore has at least two hydrolysable functional groups carried by two different silicon atoms linked to each other by a sequence of stable, particularly hydrolytically stable, atoms. A judicious choice of carbon chain $R^3$ mainly involves the length of the backbone, that is to say the number of atoms participating in the linkage between the two silicon atoms, and possibly the steric hindrance created in the region of the silicon atoms, which influences the reactivity of the hydrolysable functional groups carried by these Si atoms.

Moreover, the carbon chain $R^3$ increases the hydrophobicity of the priming agent, and therefore improves its compatibility with the hydrophobic/oleophobic agent.

Preferably:

the hydrolysable functional groups $X^1$ and $X^2$ of the priming agent are alkoxy functional groups which, used in aqueous treatment solutions, guarantee the best optical quality on transparent substrates, by preventing the formation of any haze likely to appear in certain operating conditions, with other hydrolysable functional groups;

q and q' are both equal to 0 or 1, or in other words each of the two silicon atoms of the priming agent carries two or three hydrolysable functional groups, which favours the chemical bonding of each of these two atoms, by means of oxygen atoms, both to the substrate and to the hydrophobic/oleophobic agent, hence an improvement in the cohesion of the coating and in its adhesion to the substrate.

The hydrophobic/oleophobic agent to which the priming agent of the invention is particularly suitable is of the perfluoroalkylalkylsilane type of formula:

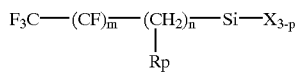

in which:

m=0 to 15;

n=1 to 5;

p=0, 1 or 2;

R is an alkyl group or a hydrogen atom; and

X is a hydrolysable functional group such as a halogen or an alkoxy, the latter being advantageous for the reasons already mentioned.

Proportions by weight of hydrophobic/oleophobic agent and of priming agent in the composition of the invention from 0.2 to 10% and from 0.05 to 10%, respectively, guarantee the best performance with regard to hydrophobicity/oleophobicity, to the adhesion of the coating to the substrate and to its durability, that is to say its erosion and abrasion resistance. In particular, superior performance is not achieved using higher proportions by weight.

With regard to the other characteristics of the solution of hydrophobic/oleophobic agent of the invention, such as the proportion of water, the use of alcohol as auxiliary solvent, and in what proportions, pH conditions, etc., Application EP 0,799,873 A1 is entirely applicable and is, in this regard, incorporated by way of reference.

The subject of the invention is also a process for forming a hydrophobic/oleophobic coating on a substrate using a composition described above, this process comprising a step consisting in bringing the substrate into contact with a priming agent in solution, in the absence of any hydrophobic/oleophobic agent, prior to bringing it into contact with the said composition. This priming agent is advantageously chosen from compounds of formulae:

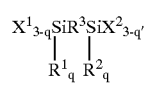 (I)

 (II)

 (III)

 (IV)

 (V)

in which:

$R^3$ represents a carbon chain;

$R^1$ and $R^2$ and R each represent an alkyl group or a hydrogen atom;

q and q' are equal to 0, 1 or 2;

$X^1$, $X^2$ and X are identical or different hydrolysable functional groups, such as a halogen or preferably an alkoxy for the reasons explained above;

n is an integer at least equal to 1.

Another subject of the invention also consists of a product whose external surface is at least partly provided with a hydrophobic/oleophobic coating formed from a composition described above.

The coated surface preferably consists of a glass material, a ceramic, a glass ceramic, a natural mineral material or a plastic.

According to an embodiment of obvious benefit, the product of the invention is monolithic, laminated or multiple glazing. It should be understood to mean that:

"monolithic glazing" is glazing consisting of a single sheet of glass or of plastic, such as polycarbonate, poly(methyl methacrylate), etc.;

"laminated glazing" is a stack of several sheets fastened to each other, for example sheets of glass or of plastic fixed to each other by means of adhesive layers made of polyvinyl butyral, polyurethane, etc.; and "multiple glazing" is an assembly of separate sheets, that is to say separated from each other by layers of air.

There are in fact two advantages of the hydrophobic/oleophobic coating of the invention for this type of product. Firstly, it allows drops of water or other liquid to run off vertical or inclined surfaces, possibly due to the effect of aerodynamic forces, for example in the case of a moving vehicle. In addition, these drops that run off encompass dirt particles and entrain them. The transparency of the glazing is improved to a degree such that it is possible to dispense in certain cases with cleaning devices (window washers or windscreen wipers).

A hydrophobic/oleophobic coating according to the invention can be combined with functional layers of different nature, depending on the requirements: a scratch-resistant layer, a decorative and/or masking layer, one or more optically selective layers, a stack of antireflection layers, an electrically conducting circuit or one or more antistatic conducting layers, each time extending over all or only part of the surface of the product.

A scratch-resistant layer, having a thickness of between about 1 and 10 μm, often proves to be useful, or indeed necessary, on the surface of certain glazing, such as a plastic (poly(methyl methacrylate), polycarbonate, etc.).

The scratch-resistant layer may be essentially inorganic, and consist especially of polysiloxanes and/or of silica and/or alumina derivatives, or hybrid, such as one consisting of entangled inorganic and organic molecular chains linked together by means of silicon-carbon bonds. Such a hybrid layer has excellent transparency, adhesion and scratch-resistance properties. It appears that the inorganic network gives the coating its hardness and its scratch resistance, while the organic network gives its elasticity and its toughness. Such varnishes are well known and have been described in the published Applications EP 0,524,417 A1 and EP 0,718,348 A1, the teaching of which is incorporated here by way of reference; some of them are especially known by the scientific community as "Ormocer" (short for "Organically Modified Ceramic").

When a scratch-resistant layer forms part of the glazing, the hydrophobic/oleophobic coating according to the invention may, according to a first embodiment, itself consist of this scratch-resistant layer; in this regard, it suffices to point out that there is a similar chemical structure, or at the very least chemical compatibility, between the aforementioned constituents of the scratch-resistant layer and of the hydrophobic/oleophobic coating.

According to other embodiments, the hydrophobic/oleophobic coating is grafted in the form of a layer having a thickness especially of between 2 and 50 nm, directly onto the scratch-resistant layer, or with the interposition of a plastic support film, for example made of poly(vinyl fluoride) or poly(vinylidene fluoride).

Furthermore, at least one decorative and/or masking layer is possibly incorporated in the glazing. This layer consists, for example, of a screen-printed decoration deposited on the internal face of the glazing, especially for motor vehicles, for the purpose of masking, for an observer located outside the vehicle, the bodywork elements forming the frame of the opening and the bead of adhesive which is thus protected from degradation by ultraviolet radiation. This layer may include opaque or transparent coloured decorative elements, making it possible to produce colour elements which match the bodywork or the interior fittings, logos, etc.

Laminated glazing usually comprises at least one adhesion layer made of polyvinyl butyral, polyurethane, or an acrylic adhesive.

Included among the other optional constituents of the glazing are also optically selective layers which are, for example, stacked beneath the decorative and/or masking layer. These layers are distinguished by a high transmission in the visible range (wavelengths from 400 to 800 nm) and a high absorption and/or reflection in the ultraviolet range (<400 nm) and infrared range (>800 nm). These layers may consist of thin metal layers, for example based on silver, having thicknesses of between 2 and 35 nm, separated from each other, as well as other adjacent layers or films, for example dielectric layers, consisting of indium, tin, silicon, zinc, titanium, tungsten, tantalum, niobium, aluminium or zirconium oxides or nitrides, generally having thicknesses of between 10 and 150 nm. These layers may include at least one solidly-coloured layer.

All these layers may be electrically conducting; they may belong to the family of sun-protection multilayers used for limiting the influx of heat by solar radiation into closed spaces or that of low-emissivity multilayers used, on the contrary, for limiting the loss of heat from closed spaces, due mainly to transmission of infrared radiation through the glazing. Such multilayers are described in Patents FR 2,708,926 and EP 0,678,484.

According to another embodiment, the glazing is provided with an antireflection multilayer. This multilayer may include, for example, an aluminium fluoride or oxyfluoride capable of being deposited as a thin film using a vacuum technique of the sputtering type, optionally magnetic-field-assisted sputtering. Such a multilayer is described in Patent FR 2,745,284, the teaching of which is incorporated here by way of reference.

The glazing also comprises where necessary, an electrically conducting circuit such as a heating circuit or a circuit having an antenna function.

Finally, the subject of the invention is also the main applications of the product described above:
- as glazing for transport vehicles or for buildings;
- as a glass ceramic hob or an oven door;
- as an element of an item of urban furniture, especially as a bus shelter element; and
- as an element of a piece of furniture, especially as a mirror, a storage shelf, a shelf for a domestic electrical appliance such as a refrigerator, a shower cabinet element, or a partition;
- as a screen, especially a television screen, a touch screen or a plasma screen.

The following examples serve to illustrate the invention.

EXAMPLE 1

Two specimens of float glass are carefully cleaned.

Next, they are treated with a 0.4 wt % $Si(OCH_3)_4$ priming solution in a 90 wt % ethanol/10 wt % water solution.

The first specimen is then brought into contact at room temperature with a solution of $CF_3(CF_2)_7(CH_2)_2Si(OC_2H_5)_3$ and $(H_3CO)_3Si(CH_2)_2Si(OCH_3)_3$ in respective proportions of 3 and 1 wt % in a 90 wt % ethanol/10 wt % water mixture acidified by 0.3M HCl.

The second specimen is brought into contact under the same conditions with a solution which differs from the treatment solution of the first specimen only by the omission of the $(H_3CO)_3Si(CH_2)_2Si(OCH_3)_3$ integrated priming agent.

The two specimens are evaluated according to the following two criteria:
- measurement of the initial angle of contact with water is a quantitative indication of the hydrophobicity of the substrate just after the treatment;
- measurement of the angle of contact with water during the Taber test carried out by means of CS 10 F grinding wheels, with application of a 500 g force, is a quantitative indication of the hydrophobicity of the treated substrate, after the latter with its coating has been subjected to abrasion of the grafted hydrophobic/oleophobic coating.

The following results are obtained:

in the case of the first specimen:
$\theta_{initial}=108°$
$\theta_{100\,t}=85°$; and in the case of the second specimen:
$\theta_{initial}=108°$
$\theta_{100\,t}=78°$.

EXAMPLE 2

The operating method of Example 1 is repeated on two specimens of float glass with a 0.8 wt % $SiCl_4$ priming solution in a perfluorinated solvent sold by the company 3M under the reference "Fluorinert FC 77".

The first specimen is brought into contact at room temperature with a 3 wt % $CF_3(CF_2)_7(CH_2)_2Si(OC_2H_5)_3$ solution in a 90 wt % ethanol/10 wt % water mixture acidified by 0.3M HCl.

The second specimen is brought into contact under the same conditions with a solution which differs from the previous one only by an additional 0.2 wt % content of $(H_3CO)_3Si(CH_2)_2Si(OCH_3)_3$.

The same measurements as in Example 1 are made and the following results are obtained:

in the case of the first specimen:
$\theta_{initial}=109°$
$\theta_{100\,t}=65°$; and in the case of the second specimen:
$\theta_{initial}=108°$
$\theta_{100\,t}=71°$.

As the examples show, the incorporation of a specific priming agent into the hydrophobic/oleophobic treatment composition according to the invention maintains or increases the initial hydrophobicity of the treated surface and appreciably improves its erosion and abrasion resistance.

What is claimed is:

1. Composition for a hydrophobic/oleophobic coating, characterized in that it consists essentially of an aqueous solution of a hydrophobic/oleophobic agent containing a priming agent of formula:

in which:

$X^1$ and $X^2$ are identical or different hydrolysable halogen or alkoxy groups; and the hydrophobic/oleophobic agent is a perfluoroalkylalkylsilane of formula:

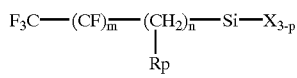

in which:

m=0 to 15;

n=1 to 5:

p=0, 1 or 2;

R is an alkyl group or a hydrogen atom; and

X is a halogen or an alkoxy group.

2. Composition according to claim 1, characterized in that in the formula (I), $X^1$ and $X^2$ are alkoxy groups.

3. Composition according to claim 1, characterized in that the aqueous solution contains 0.2 to 10% by weight of hydrophobic/oleophobic agent and 0.05 to 10% by weight of priming agent.

4. Process for forming a hydrophobic/oleophobic coating on a substrate using a composition according to claim 1, characterized in that it comprises a step consisting of bringing the substrate into contact with a priming agent in solution, in the absence of any hydrophobic/oleophobic agent, prior to bringing it into contact with said composition.

5. Process according to claim 4, characterized in that the priming agent with which the substrate is brought into contact, prior to bringing it into contact with a composition according to claim 1, is chosen from those having the formulae:

 (I)

 (II)

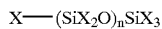 (III)

 (IV)

 (V)

in which:

$R^3$ represents a carbon chain;

$R^1$, $R^2$ and R each represent an alkyl group or a hydrogen atom;

q and q' are equal to 0, 1 or 2;

$X^1$, $X^2$ and X are identical or different hydrolysable halogen or alkoxy groups;

n is an integer at least equal to 1.

6. Process according to claim 5, characterized in that in the formulae (I), (II), (III), (IV) and (V), $X^1$, $X^2$ and X are alkoxy functional groups.

7. A composition according to claim 1, wherein said hydrophobic/oleophobic agent is of the formula $CF_3(CF_2)_7(CH_2)_2Si(OC_2H_5)_3$.

8. Product whose external surface is at least partly provided with a hydrophobic/oleophobic coating formed from a composition according to claim 1.

9. Product according to claim 8, characterized in that the external surface provided with a coating consists of a glass material, a ceramic, a glass ceramic, a natural mineral material or a plastic.

10. Product according to claim 8, consisting of monolithic, laminated or multiple glazing.

11. Product according to claim 10, characterized in that it comprises, over all or part of its surface, a scratch-resistant layer and/or a decorative layer and/or a masking layer and/or one or more optically selective layers and/or a stack of antireflection layers and/or an electrically conducting circuit and/or one or more antistatic conducting layers.

12. A product according to claim 8 as glazing for transport vehicles or for buildings.

13. A product according to claim 8 as a glass ceramic hob or an oven door.

14. A product according to claim 8 as a bus shelter element.

15. A product according to claim 8 as an element of a piece of furniture, a storage shelf, a shelf for a domestic electrical appliance a shower cabinet element, or a partition.

16. A product according to claim 8 as a screen.

17. A product according to claim 8, as an element of a mirror.

18. A product according to claim 8, as an element of a refrigerator.

19. A product according to claim 8, as a television screen, a touch screen or a plasma screen.

* * * * *